United States Patent
Urata et al.

(10) Patent No.: US 9,561,829 B1
(45) Date of Patent: Feb. 7, 2017

(54) ROBOTIC LEG WITH MULTIPLE ROBOTIC FEET

(71) Applicant: X Development LLC, Mountain View, CA (US)

(72) Inventors: Junichi Urata, Tokyo (JP); Masaki Hamafuji, Tokyo (JP)

(73) Assignee: X Development LLC, Mountain View, CA (US)

( * ) Notice: Subject to any disclaimer, the term of this patent is extended or adjusted under 35 U.S.C. 154(b) by 77 days.

(21) Appl. No.: 14/613,632

(22) Filed: Feb. 4, 2015

Related U.S. Application Data

(60) Provisional application No. 62/045,076, filed on Sep. 3, 2014.

(51) Int. Cl.
*B62D 57/032* (2006.01)
*B62J 11/00* (2006.01)
*B62D 57/02* (2006.01)

(52) U.S. Cl.
CPC ............ *B62D 57/032* (2013.01); *B62D 57/02* (2013.01); *B62J 11/00* (2013.01)

(58) Field of Classification Search
None
See application file for complete search history.

(56) References Cited

U.S. PATENT DOCUMENTS

| | | | | |
|---|---|---|---|---|
| 4,834,200 A * | 5/1989 | Kajita | ................... | B62D 57/02 180/8.1 |
| 6,662,421 B1 * | 12/2003 | Krippelz, Sr. | ...... | B25B 27/0035 248/229.12 |
| 7,348,747 B1 * | 3/2008 | Theobold | ................. | B25J 5/005 318/568.11 |
| 7,946,364 B2 | 5/2011 | Suga et al. | | |
| 8,103,383 B2 * | 1/2012 | Nakamura | ............. | B25J 9/1676 318/568.12 |
| 8,185,241 B2 * | 5/2012 | Jacobsen | ............ | B62D 55/0655 700/1 |
| 8,267,188 B2 * | 9/2012 | Nicholson | ............ | B23Q 1/4876 173/197 |

(Continued)

OTHER PUBLICATIONS

Harbick, Kale; Sukhatme, Gaurav. "Height Control for a One-legged Hopping Robot using a one-dimentional model." Institute for Robotics and Intelligent Systems, USC, 2001.*

(Continued)

*Primary Examiner* — Rami Khatib
*Assistant Examiner* — Jeffrey Boomer
(74) *Attorney, Agent, or Firm* — McDonnell Boehnen Hulbert & Berghoff LLP

(57) ABSTRACT

Disclosed are robotic systems, methods, bipedal robot devices, and computer-readable mediums. For example, a robotic system may include a robotic body, a robotic hip connected to the robotic body, a robotic leg connected to the robotic hip. Further, the robotic system may include a first robotic foot that is connected to one end of the robotic leg and a second robotic foot is connected to an opposite end of the robotic leg. Yet further, the robotic leg may be fully rotatable around an axis of rotation defined by the robotic hip. In addition, the robotic hip may be linearly movable along the robotic leg to one or more positions between the one end of the robotic leg and the opposite end of the robotic leg.

9 Claims, 11 Drawing Sheets

(56) References Cited

U.S. PATENT DOCUMENTS

| | | | | |
|---|---|---|---|---|
| 8,644,991 | B2* | 2/2014 | Ohm | G05D 1/0246 180/9.3 |
| 9,002,512 | B2* | 4/2015 | Park | B62D 57/032 700/245 |
| 9,280,159 | B1* | 3/2016 | Ito | G05D 1/0225 |
| 9,387,896 | B1* | 7/2016 | Blankespoor | B62D 57/032 |
| 9,475,191 | B1* | 10/2016 | Urata | B25J 9/1633 |
| 2005/0230159 | A1* | 10/2005 | Maslov | B25J 19/0091 180/8.1 |
| 2005/0275367 | A1* | 12/2005 | Buehler | B25J 9/102 318/568.12 |
| 2006/0076167 | A1* | 4/2006 | Setrakian | B62D 57/00 180/8.1 |
| 2009/0039819 | A1* | 2/2009 | Wilson | B25J 9/102 318/568.12 |
| 2010/0036527 | A1* | 2/2010 | Matsunaga | B25J 9/1676 700/264 |
| 2010/0274431 | A1* | 10/2010 | Matsunaga | B25J 9/1664 701/26 |
| 2011/0106310 | A1* | 5/2011 | Kawaguchi | B25J 13/00 700/253 |
| 2012/0031218 | A1* | 2/2012 | Galloway | B62D 57/032 74/490.03 |
| 2012/0168233 | A1 | 7/2012 | Clark | |
| 2012/0259460 | A1 | 10/2012 | Rizzi et al. | |
| 2013/0013111 | A1* | 1/2013 | Hurst | B62D 57/032 700/258 |
| 2014/0348618 | A1* | 11/2014 | Blank | H01L 21/67742 414/217 |
| 2016/0023699 | A1* | 1/2016 | Saunders | G05D 16/2006 180/8.6 |

OTHER PUBLICATIONS

Ebefors, Thorbjorn; Stemme, Goran; "A walking silicon microrobot." Presented at the 10th Int Conference on Solid-State Sensors and Actuators (Transducers'99), Sendai, Japan, Jun. 7-10, 1999, pp. 1202-1205.*

G. Clark Haynes, Jason Pusey, Ryan Knopf, Aaron M. Johnson, and Daniel E. Koditschek, "Laboratory on Legs: An Architechture for Adjustable Morphology with Legged Robots", . Apr. 2012.*

Ritzmann, Roy; Schroer, Robert; Boggess, Matthew; Bachmann, Richard; Quinn, Roger; Comparing Cockroach and Whegs Robot Body Motions; Proceedings of the 2004 IEEE International Conference on Robotics and Automation. New Orleans, LA. Apr. 2004.*

Shimizu, Thoshimi; Botelho, Wagner; Okada, Tokuji; Abeer Mahomoud; "Software and Hardware COntrol of a Hybrid Robot for Switching between LEg-type and wheel-type modes." Sba Controle & Automacao vol. 22 No. 1 Campinas Feb. 2011.*

Shimizu, Thoshimi; Botelho, Wagner; Okada, Tokuji; "Motion Analysis with Experimental Verification of the Hybrid Robot PEOPLER-II for Reversible Switch between Walk and Roll on Demand." The International Journal of Robotics Research. vol. 29, No. 9, Aug. 2011, pp. 1199-1221.*

Robotics Unlimited, OutRunner: The World's First RC Running Robot, https://www.kickstarter.com/projects/138364285/outrunner-the-worlds-most-advanced-running-robot, 2014, 23 pages.

MIT Leg Laboratory, Planar Biped (1985-1990), http://www.ai.mit.edu/projects/leglab/robots/robots.html,1990, 3 pages.

* cited by examiner

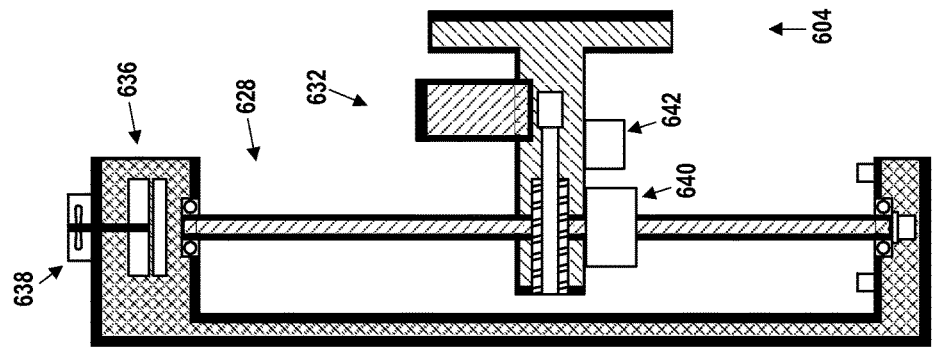
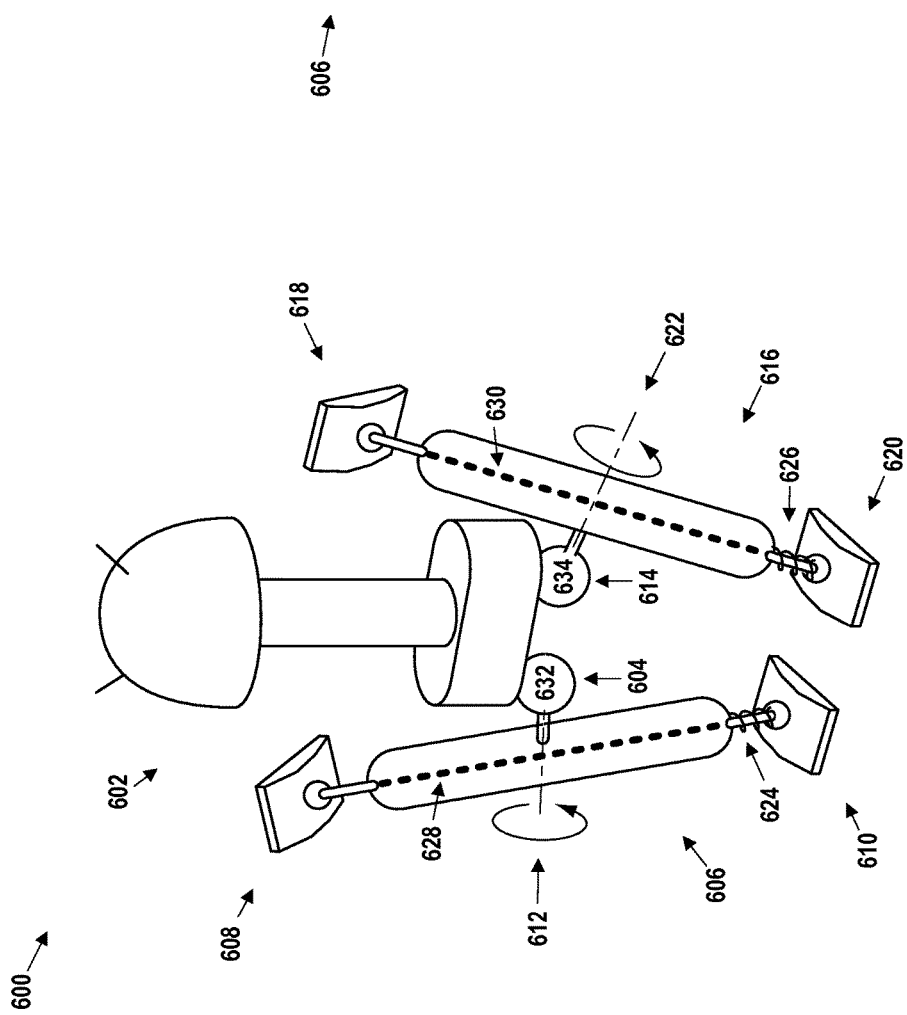

ROBOTIC LEG WITH MULTIPLE ROBOTIC FEET

CROSS-REFERENCE TO RELATED APPLICATION

This application claims the benefit of U.S. Provisional Application No. 62/045,076, filed Sep. 3, 2014.

BACKGROUND

One type of a robot system may be a humanoid robot. These robotic systems may have a structure that resembles a human body. One example robot system may have a robotic head, two robotic arms, a main robotic body, and two robotic legs. The two robotic legs may be used for bipedal walking that mimics human walking. For example, each of the robotic legs may include a robotic knee, a robotic ankle, and a robotic foot. As such, the robotic system may take steps to engage in bipedal walking. For instance, the robotic system may use one leg to bear weight of the robotic system while the other leg swings forward to take step in a given direction.

SUMMARY

It may be challenging for a robotic system to engage in bipedal walking. For example, similar to human walking, the robotic system may be susceptible to tripping over an object in the way of its robotic leg swinging forward to take a step. Further, the robotic system may have instabilities in its robotic knees, robotic ankles, and robotic feet. Yet, by connecting the robotic hip to the robotic leg such that the robotic hip is linearly movable along the robotic leg, some of these instabilities may be addressed. For example, the robotic leg may be connected to the robotic hip such that it is fully rotatable around an axis of rotation defined by the robotic hip. As such, each robotic leg may rotate around respective robotic hip joints to move the robotic legs in a "windmill" type fashion, thereby reducing the movements involving robotic legs swinging forward. Thus, the chances of the robotic system tripping over objects may be decreased.

Further, in addition to the instabilities associated with the robotic knees, the robotic system may encounter stresses in certain parts of the robotic body, such as the robotic knees, the robotic ankles, and the robotic feet. These parts of the robotic system may encounter stresses and tensions that may eventually lead to the robotic system breaking down. Thus, these robotic systems may eventually lead to worn parts, possibly requiring repairs and/or replacements. By connecting the robotic hip to a ball screw positioned parallel in the robotic leg, the weight of the robotic system may rest on the ball screw as opposed to one or more joints in the robotic system. As such, the ball screw may make the robotic system more robust, possibly reducing the number of joints that require repairs and/or replacements.

In one implementation, a robotic system is provided. The robotic system includes a robotic body, a robotic hip connected to the robotic body, and a robotic leg connected to the robotic hip. Further, a first robotic foot is connected to one end of the robotic leg and a second robotic foot is connected to an opposite end of the robotic leg, where the robotic leg is fully rotatable around an axis of rotation defined by the robotic hip, and where the robotic hip is linearly movable along the robotic leg to one or more positions between the one end of the robotic leg and the opposite end of the robotic leg.

Another implementation includes moving, by a robotic system, a robotic hip linearly along a robotic leg to one or more positions between one end of the robotic leg and an opposite end of the robotic leg, where the robotic leg comprises a first robotic foot connected to the one end of the robotic leg and a second robotic foot connected to the opposite end of the robotic leg. Further, the implementation includes rotating, by the robotic system, the robotic leg around an axis of rotation defined by the robotic hip.

In yet another implementation, a bipedal robot device is provided. The bipedal robot device includes a robotic body, a robotic hip connected to the robotic body, and a robotic leg connected to the robotic hip. Further, a first robotic foot is connected to one end of the robotic leg and a second robotic foot is connected to an opposite end of the robotic leg, where the robotic leg is fully rotatable around an axis of rotation defined by the robotic hip, and where the robotic hip is linearly movable along the robotic leg to one or more positions between the one end of the robotic leg and the opposite end of the robotic leg.

In still another implementation, a robotic system is provided. The robotic system may include a robotic body, a robotic hip connected to the robotic body, and a robotic leg connected to the robotic hip. Further, the robotic system may include means for moving the robotic hip linearly along the robotic leg to one or more positions between one end of the robotic leg and an opposite end of the robotic leg, where the robotic leg comprises a first robotic foot connected to the one end of the robotic leg and a second robotic foot connected to the opposite end of the robotic leg. Further, the robotic system may include means for rotating the robotic leg around an axis of rotation defined by the robotic hip.

In another implementation, a robotic system is provided. The robotic system includes a robotic body, a robotic hip connected to the robotic body, a ball screw connected to the robotic hip, and a robotic leg connected to the robotic hip parallel to the ball screw, where the robotic hip comprises a motor that is linearly movable to one or more positions along the ball screw between one end of the robotic leg and an opposite end of the robotic leg.

Yet another implementation includes moving, by a robotic system, a motor of a robotic hip linearly along a ball screw connected parallel to a robotic leg, where the motor moves to one or more positions along the ball screw between one end of the robotic leg and an opposite end of the robotic leg, where the robotic hip is connected to a robotic body. Further, the implementation includes rotating, by the robotic system, the robotic leg around an axis of rotation defined by the robotic hip. Based on rotating the robotic leg, the implementation includes causing the robotic leg to take a step.

In still another implementation, bipedal robot device is provided. The bipedal robot device includes a robotic body, a robotic hip connected to the robotic body, a ball screw connected to the robotic hip, and a robotic leg connected to the robotic hip parallel to the ball screw, where the robotic hip comprises a motor that is linearly movable to one or more positions along the ball screw between one end of the robotic leg and an opposite end of the robotic leg.

In an additional implementation, a robotic system is provided. The robotic system includes a robotic body, a robotic hip connected to the robotic body, a ball screw connected to the robotic hip, and a robotic leg connected to the robotic hip parallel to the ball screw. Further, the robotic system may include means for moving a motor of a robotic hip linearly along the ball screw, where the motor moves to one or more positions along the ball screw between one end of the robotic leg and an opposite end of the robotic leg, where the robotic hip is connected to a robotic body. Further, the robotic system may include means for rotating the robotic leg around an axis of rotation defined by the robotic hip. Based on rotating the robotic leg, the robotic system may include means for causing the robotic leg to take a step.

These as well as other implementations, aspects, advantages, and alternatives will become apparent to those of ordinary skill in the art by reading the following detailed description, with reference where appropriate to the accompanying drawings. Further, this summary and other descriptions and figures provided herein are intended to illustrate implementations by way of example only and numerous variations are possible. For instance, structural elements and process steps can be rearranged, combined, distributed, eliminated, or otherwise changed, while remaining within the scope of the implementations as claimed.

BRIEF DESCRIPTION OF THE DRAWINGS

FIGS. 6A and 6B depict aspects a robotic system, according to an example implementation.

DETAILED DESCRIPTION

Figure 1:
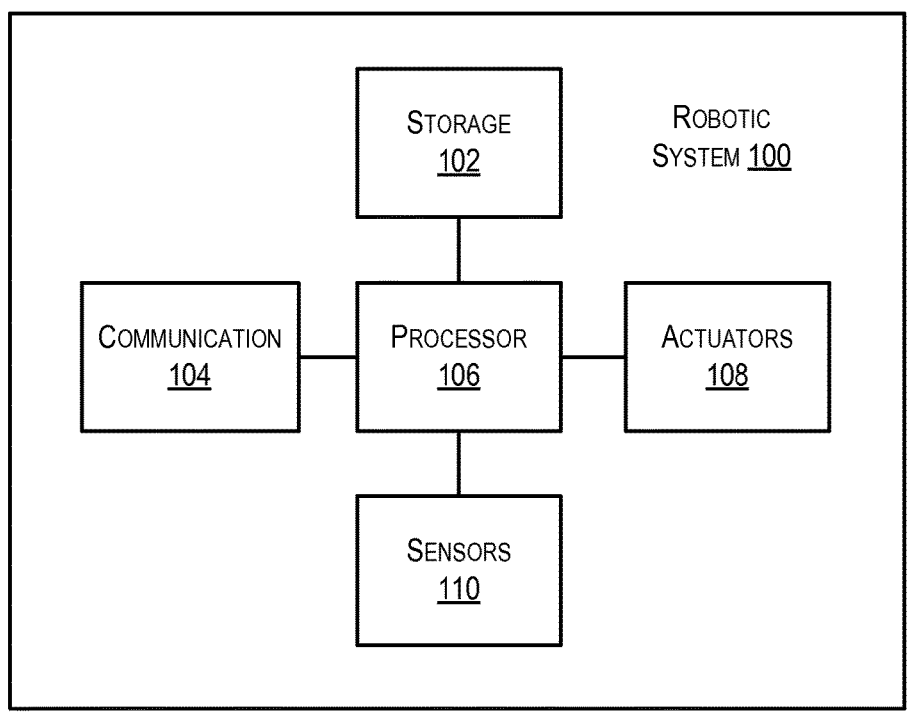
FIG. 1 depicts aspects of a robotic system, according to an example implementation.

Example systems, methods, devices, and computer-readable mediums are described herein. It should be understood that the words "example" and "exemplary" are used herein to mean "serving as an example, instance, or illustration." Any implementation or feature described herein as being an "example" or "exemplary" is not necessarily to be construed as preferred or advantageous over other implementations or features. Other implementations can be utilized, and other changes can be made, without departing from the scope of the subject matter presented herein.

Thus, the example implementations described herein are not meant to be limiting. The aspects of the present disclosure, as generally described herein, and illustrated in the figures, can be arranged, substituted, combined, separated, and designed in a wide variety of different configurations, all of which are explicitly contemplated herein.

I. Overview

Among various challenges to bipedal walking, a robotic system may face obstacles associated with the dynamics of its robotic legs. In particular, the robotic system may encounter instabilities with controlling a robotic hip connected to the robotic leg and further moving parts of the robotic leg such as a robotic knee, a robotic ankle, and a robotic foot. As such, a single step of the robotic system may involve moving multiple parts of the robotic system. Thus, the robotic system may be susceptible to tripping due to such complex dynamics of the robotic system. Further, as noted, the robotic system may also come across objects in the path of a robotic leg swinging forward to take a step, increasing the chances of the robotic system tripping and falling.

Thus, example implementations herein describe robotic hips connected to the robotic legs such that the robotic hips are linearly movable along respective robotic legs. Further, each robotic leg may be connected to its respective robotic hip such that each robotic leg is fully rotatable around an axis of rotation defined by its respective robotic hip. As such, each robotic leg may rotate around its respective robotic hip joint interchangeably to move the robotic legs in a "windmill" type fashion, propelling the robotic system forward. With less dynamics involved with the robotic legs and reducing the motion of the robotic legs swinging forward to take steps, the chances of the robotic system tripping may be decreased.

In addition to the challenges noted above, robotic joints such as robotic knees and robotic ankles may frequently encounter stresses and tensions during bipedal walking. For example, robotic knees may encounter large torque forces that may eventually damage the robotic legs. As such, additional implementations herein describe the robotic hips connected to ball screws positioned parallel in the respective robotic legs. Thus, the weight of the robotic system may rest on the ball screws as opposed to, for example, the robotic knees. The ball screws may reduce the stress on the robotic joints and therefore, lessen the number repairs and/or replacements.

II. Example Implementations

FIG. 1 depicts aspects of a robotic system, according to an example implementation. In some examples, robotic system 100 may include computer hardware, such as a storage 102, a communication component 104, a processor 106, actuators 108, and sensors 110. For example, one or more of these hardware components may be designed for a robotic system 100 such as a humanoid robot and/or a bipedal-robot device.

Storage 102 may be a memory that includes a non-transitory computer-readable medium having stored thereon program instructions. The processor 106 may be coupled to the storage 102 to cause the robotic system 100 to perform operations based on executing these program instructions. Further, the processor 106 may be coupled to the communication component 104 for communicating with other robotic systems, robots, and/or devices. For example, communication component 104 may be used to access one or more server devices of a network. In some implementations, communication component 104 may include a wired connection including, for example, a parallel bus or a serial bus such as a Universal Serial Bus (USB). Further, communication component 104 may include a wireless connection including, for example, Bluetooth, IEEE 802.11, Cellular (such as GSM, CDMA, UMTS, EV-DO, WiMAX, or LTE), or Zigbee, among other possibilities.

Processor 106 may store, in the storage 102, data obtained from the sensors 110. In some examples, sensors 110 may include a gyroscope, an accelerometer, a Doppler sensor, a sonar sensor, a radar device, a laser-displacement sensor, and/or a compass, possibly to measure locations and/or movements of the robotic system 100. Yet further, sensors 110 may include an infrared sensor, an optical sensor, a light sensor, a camera, a biosensor, a capacitive sensor, a touch sensor, a temperature sensor, a wireless sensor, a radio sensor, a sound sensor, and/or a smoke sensor, possibly to obtain data indicative of an environment of the robotic system 100. In addition, sensors 110 may include a sensor that measure forces acting about the robotic system 100. For example, sensors 110 may include a sensor that measures forces (e.g., inertial forces and/or G-forces) in multiple dimensions. Further, sensors 110 may include a sensor that measures torque (possibly referred to herein as a "force-torque sensor"), a sensor that measures ground forces (possibly referred to a "ground force sensor" and/or a "friction sensor"), and a zero moment point (ZMP) sensor that identifies ZMPs and/or locations of the ZMPs, among other possibilities.

The robotic system 100 may also have actuators 108 that enable the robotic system 100 to initiate movements. For example, the actuators 108 may include or be incorporated with robotic joints connecting robotic limbs to a robotic body. For example, the actuators 108 may include robotic hip joints connecting robotic legs to the robotic body. Further, the actuators 108 may include robotic knee joints connecting parts (e.g., robotic thighs and robotic calves) of the robotic legs. Yet further, the actuators 108 may include robotic ankle joints connecting the robotic legs to robotic feet. In addition, the actuators 108 may include motors for moving the robotic limbs. As such, the actuators 108 may enable the mobility of the robotic system 100 in an environment of the robotic system 100.

The robotic system 100 may include one or more direct current (DC) motors, permanent magnet motors, fuel powered motors (e.g., gasoline and/or gas powered motors), and/or servo motors to move the robotic limbs. Such motors may allow the robotic system 100 to have precise control of its actuators 108 and the movement of the robotic limbs. Yet, such motors may also be heavy, thereby causing the robotic system 100 to consume more power to move robotic limbs. Further, the weight of the motors may cause the robotic legs to make heavy impacts with the ground, possibly damaging the robotic legs over time and/or after traveling long distances. In some implementations, the robotic system 100 may include hydraulic mechanisms to move the robotic limbs. The hydraulic systems may give the robotic system 100 more strength, enabling the robotic system 100 to lift heavy objects. Yet, the hydraulic mechanisms may require pumps that may be bulky, taking up additional space in the robotic system. In addition, the hydraulic mechanisms may be difficult to control such that the robotic movements may appear spastic, jerky, and/or less precise.

Thus, the robotic system 100 may include smaller and/or lightweight motors to move the robotic limbs. Yet, such motors may encounter challenges as well. For example, the actuators 108 with smaller motors may deliver a limited amount of power. Thus, decreasing the size of motors may cause the robotic system 100 to be weaker. Further, driving the motors at higher speeds may cause the motors to emanate thermal energy, possibly overheating the robotic system. Yet further, it may be difficult to determine the internal temperature of the motors to prevent the robotic system from overheating.

Figure 2:
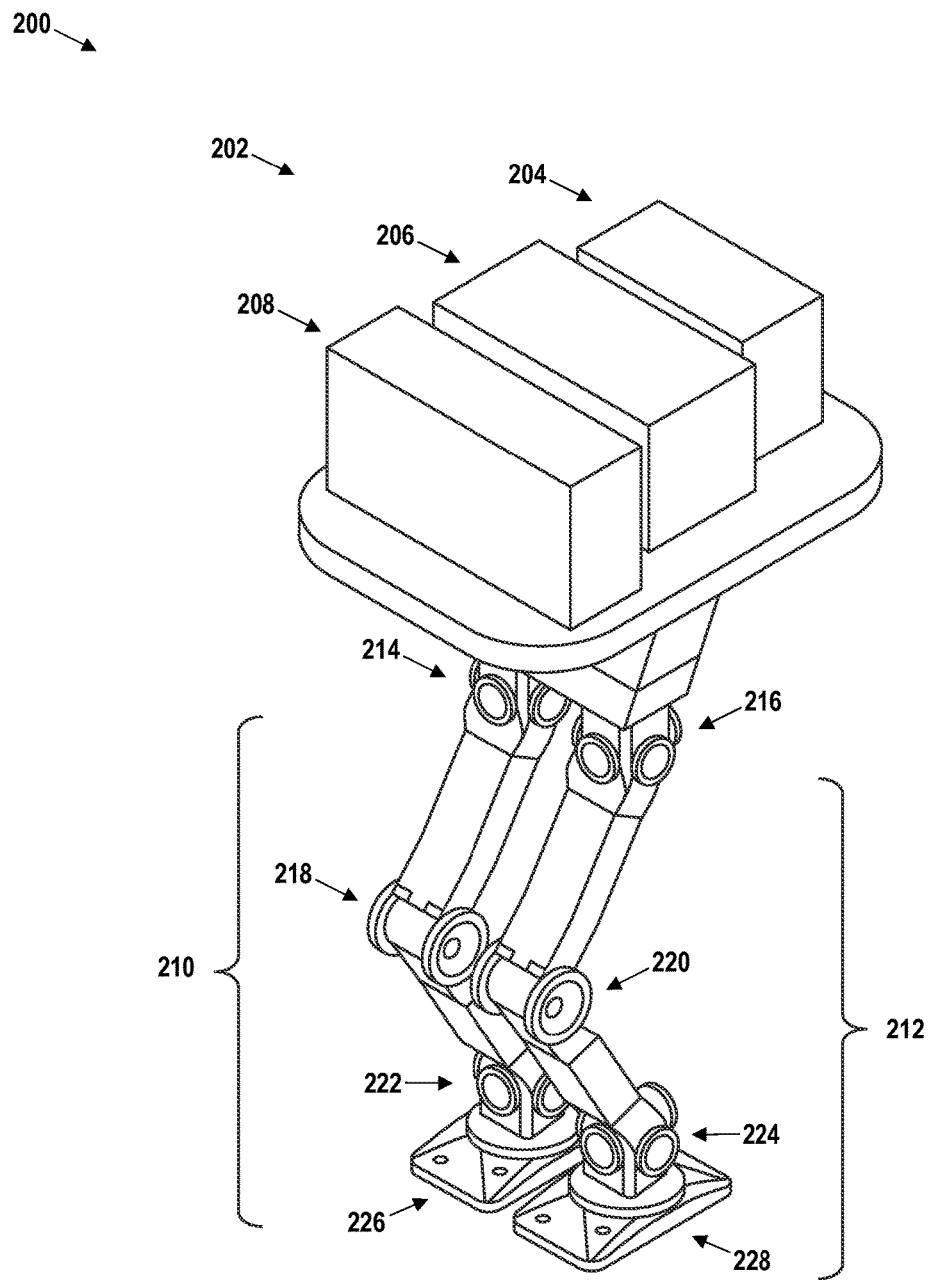
FIG. 2 depicts aspects of a robotic system, according to an example implementation.

FIG. 2 depicts aspects of a robotic system, according to an example implementation. The robotic system 200 may include, for example, one or more parts of the robotic system 100 in relation to FIG. 1. For example, the robotic legs 210 and 212 may include sensors 110, such as sensors that measure inertial forces and/or G-forces in multiple dimensions, a force-torque sensor, a ground force sensor, a friction sensor, and/or a ZMP sensor, among other possibilities.

As shown, a robotic body 202 that may include a battery 204, a radiator 206, and a capacitor 208. The robotic system 200 may also include two robotic hips 214 and 216, connecting the robotic body 202 to two robotic legs 210 and 212, respectively. Further, the two robotic legs 210 and 212 may include two robotic knees 218 and 220, two robotic ankles 222 and 224, and two robotic feet 226 and 228, respectively. The robotic system 200 may weigh approximately 30 to 80 kilograms.

Battery 204 may be used to power the robotic system 200. Radiator 206 may transfer thermal energy from one part of the robotic system 200 to another for cooling the robotic system 200. The radiator 206 may provide liquids to cool the motors in the robotic system 200. Capacitor 208 may be a multi-layered capacitor (e.g., a double-layered capacitor) operable to produce current in a shortened period of time. The capacitor 208 may produce currents to power the motors when the available power capacity in the capacitor 208 is lower than one or more capacity thresholds. For example, the capacitor 208 may supply varying amounts of current to motors and drivers in the robotic legs 210 and 212, possibly more reliably than the battery 204. In some instances, the capacitor 208 may operate with an approximate voltage of 50-150 V, an approximate capacitance of 7-21 farads, and an approximate internal resistance of 25-150 mΩ.

The robotic system 200 may include one or more motors powered by the capacitor 208. For example, the robotic system 200 may include one or more of the motors that generate heat and are cooled by lower temperature liquids around the motors. For example, the robotic knees 218 and 220 may include motors cooled by liquids to achieve rotational speeds over approximately 1,000-2,000 degrees per second and over approximately 350-700 newton meters (Nm) of torque.

Further, the motors cooled by liquids may be used to move robotic hips 214 and 216. Additionally, these motors may be used to move the robotic legs 210 and 212. In particular, these motors may be positioned in the robotic knees 218 and 220, and the robotic ankles 222 and 224. As such, the robotic system 200 may engage in bipedal walking, possibly resembling the walking patterns of a human person. The weight of the robotic system 200 may shift on to each of the robotic legs 210 and 212 interchangeably. In particular, the robotic system 200 may shift the weight on to the robotic foot 226 as the robotic leg 212 swings forward to take a step. Further, the robotic system 200 may shift the weight on to the robotic foot 228 as the robotic leg 210 swings forward to take a step.

The robotic system 200 may be operable through remote controls. Yet, the robotic system 200 may also be operable autonomously. For example, the robotic system 200 may include control algorithms that maintain the stability and balance of the robotic system 200. These algorithms may implement a push-recovery capability such that the robotic system 200 may maintain its balance after a force is applied to the robotic system 200. This capability may cause the robotic system 100 to reposition the robotic legs 210 and 212, and the robotic feet 226 and 228. For instance, the robotic system 200 may maintain balance on the robotic legs 210 and 212, and the robotic feet 226 and 228 after being hit, kicked, and/or shoved. The robotic system 200 may be capable of computing approximately 70 to 270 placements of the robotic legs 210 and 212, and the robotic feet 226 and 228 in less than approximately 0.1-1 milliseconds.

Figure 3:
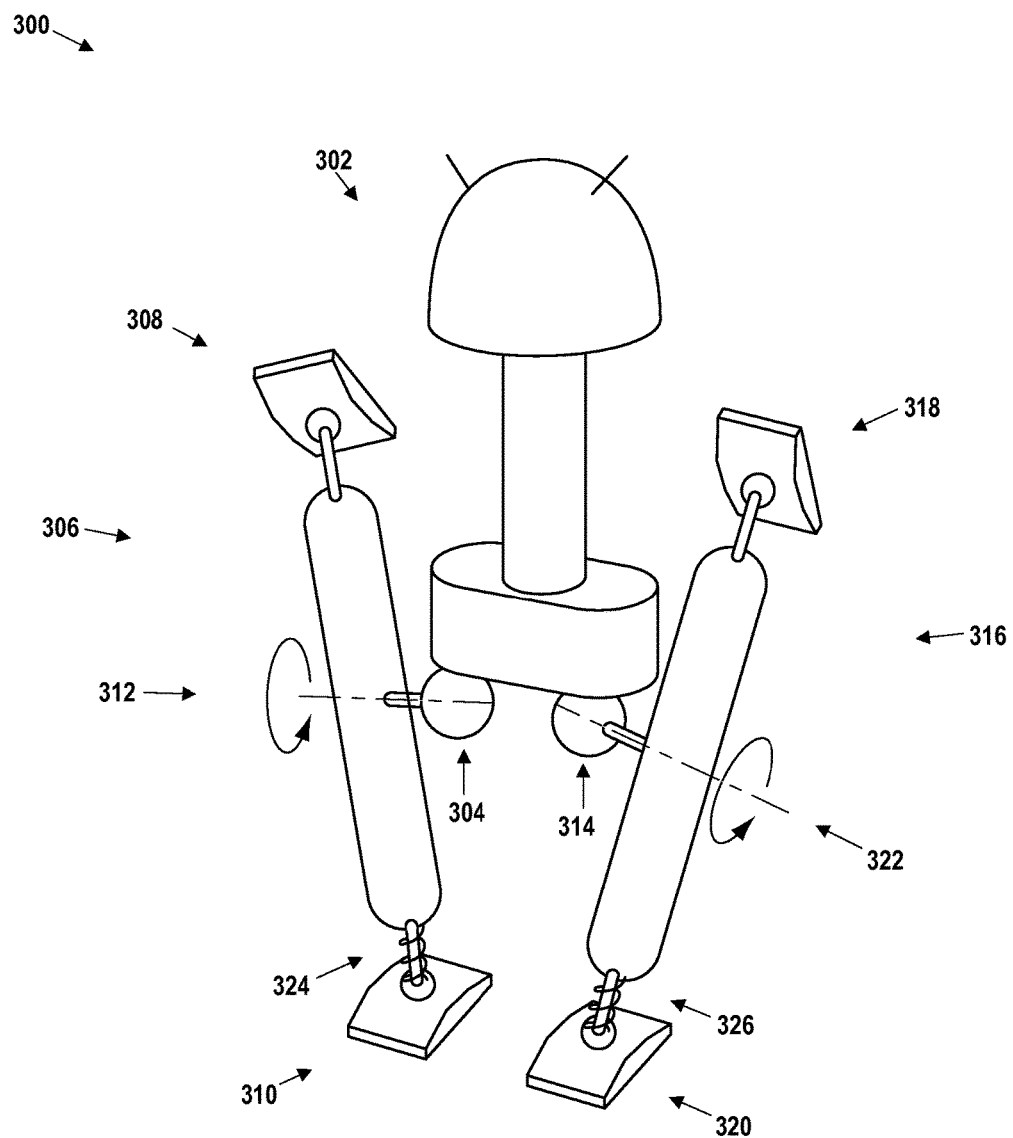
FIG. 3 depicts aspects of a robotic system, according to an example implementation.

FIG. 3 depicts aspects of a robotic system, according to an example implementation. The robotic system 300 may take, for example, the form of a bipedal robot device and/or a multi-legged robot device such as a quadruped robot device, among various possibilities. Further, the robotic system 300 may include, for instance, one or more of the parts described above in relation to robotic systems 100 and 200 shown in FIGS. 1 and 2, respectively.

As shown in FIG. 3, the robotic system 300 may include a robotic body 302, a robotic hip 304 connected to the robotic body 302, and a robotic leg 306 connected to the robotic hip 304. A first robotic foot 308 may be connected to one end of the robotic leg 306 and a second robotic foot 310 may be connected to an opposite end of the robotic leg 306. The robotic leg 306 may be fully rotatable around an axis of rotation 312 defined by the robotic hip 304. Further, the robotic hip 304 may be linearly movable along the robotic leg 306 to one or more positions between the one end of the robotic leg 306 and the opposite end of the robotic leg 306.

Yet further, the robotic system 300 may include a second robotic hip 314 connected to the robotic body 302 and a second robotic leg 316 connected to the second robotic hip 314. A third robotic foot 318 may be connected to one end of the second robotic leg 316 and a fourth robotic foot 320 may be connected to an opposite end of the second robotic leg 316. The second robotic leg 316 may be fully rotatable around a second axis of rotation 322 defined by the second robotic hip 314, as shown by the circular arrow around the second axis of rotation 322. In addition, the second robotic hip 314 may be linearly movable along the second robotic leg 316 to one or more positions between the one end of the second robotic leg 316 and the opposite end of the second robotic leg 316. For example, the second robotic hip 314 may be linearly moveable the robotic leg 316 to one or more positions between the third robotic foot 318 and the fourth robotic foot 320.

Further, the robotic leg 306 and the second robotic leg 308 may be partially or fully rotatable in the opposite directions of the circular arrows around the axes of rotation 312 and 322, respectively. The robotic legs 306 and 308 may rotate over varying axes of rotation 312 and 322, respectively. For example, the robotic hips 304 and 314 may be moveable over multiple degrees of freedom (DOF) to vary the axes of rotation 312 and 322, respectively. In particular, the robotic hips 304 and 306 may include ball and socket mechanisms to be movable over the multiple DOF, possibly to change the axes of rotation 312 and 322, respectively.

In some implementations, the robotic system 300 may include different types of robotic feet, possibly for bipedal walking without the windmill type movements. For example, the second robotic foot 310 may include a rubber base that facilitates friction against adjacent surfaces. For example, the rubber base may take the form of a rain shoe that creates friction against the adjacent surfaces covered in rain, snow, and/or other forms of liquids. Further, the first robotic foot 308 may include a wider base than the rubber base. For example, the wider base may distribute the weight of the robotic system 300 over more area of the adjacent surfaces than the rubber base. In some implementations, the wider base may take the form of a snow shoe that distributes the weight of the robotic system 300 over more area of the adjacent surfaces covered in snow. Further, the third robotic foot 318 may take any of the forms of the robotic foot 308 and the fourth robotic foot 320 may take any of the forms of the robotic foot 310, among other possibilities.

In some implementations, the robotic system 300 may include different types of robotic legs and/or robotic feet for various types of movements of the robotic system 300. Further, the robotic system 300 may include different types of feet for walking, jogging, running, and/or jumping. For example, the robotic foot 308 and the third robotic foot 318 may be used for walking, and the second robotic foot 310 and the fourth robotic foot 320 may be used for running and jumping, among other possibilities. Further, the robotic leg 306 may include a first spring 324 that applies a first force against the second robotic foot 310. Further, the second robotic leg 316 may include a second spring 326 that applies a second force against the fourth robotic foot 320. As such, the first spring and the second spring may store energy for applying the first force and the second force, respectively, thereby springing the robotic system 302 off ground surfaces.

In some implementations, the robotic system 300 may include a non-transitory computer-readable medium that stores program instructions executable by one or more processors, such as the processor 106 of the robotic system 100 described above in relation to FIG. 1. The program instructions may cause the robotic system 300 to perform operations. For example, the robotic hip 304 may move along the robotic leg 306 to a first position of the one or more positions between the one end of the robotic leg 306 and the opposite end of the robotic leg 306. Further, the second robotic hip 314 may move along the second robotic leg 316 to a second position of the one or more positions between the one end of the second robotic leg 316 and the opposite end of the second robotic leg 316.

In some implementations, a first length of the robotic leg 306 may be approximately equivalent to a second length of the second robotic leg 316. For example, the first position may be approximately half way between the one end of the robotic leg 306 proximately connected to the first robotic foot 308 and the opposite end of the robotic leg 306 proximately connected to the second robotic foot 310. Further, the second position may be approximately half way between the one end of the second robotic leg 316 proximately connected to the third robotic foot 318 and the opposite end of the second robotic leg 316 proximately connected to the fourth robotic foot 320. As such, the robotic system 300 may stand such that the robotic hip 304 may be approximately level with the second robotic hip 314.

In some implementations, the robotic system 300 may cause the robotic leg 306 to rotate up to 360 degrees around the axis of rotation 312 defined by the robotic hip 304 and cause the second robotic leg 316 to rotate up to 360 degrees around the second axis of rotation 322 defined by the second robotic hip 314. In particular, the robotic leg 306 and the second robotic leg 316 may rotate with an approximate phase difference of 90 degrees. Thus, the robotic leg 306 may rotate first followed by the second robotic leg 316 rotating thereafter.

In some implementations, the robotic system 300 may cause the robotic leg 306 up to rotate up to 180 degrees around the axis of rotation 312 defined by the robotic hip 304, where the weight of the robotic system 300 is shifted from being placed on the second robotic foot 310 to the first robotic foot 308. In particular, the robotic leg 306 may rotate in the direction of the circular arrow around the axis of rotation 312, thereby switching the weight from being placed on the second robotic foot 310 to the first robotic foot 308.

Further, the robotic system 300 may cause the second robotic leg 316 to rotate up to 180 degrees around the second axis of rotation 322 defined by the second robotic hip 314, where the weight of the robotic system is shifted from being placed on the fourth robotic foot 320 to the third robotic foot 318. In particular, the second robotic leg 316 may rotate in the direction of the circular arrow around the axis of rotation 322, thereby switching the weight from being placed on the fourth robotic foot 320 to the third robotic foot 318. Based on causing the robotic leg 312 and the second robotic leg 322 to rotate, the robotic system 300 may take an initial step with the first robotic foot 308 and a subsequent step with the third robotic foot 318.

Figure 4:
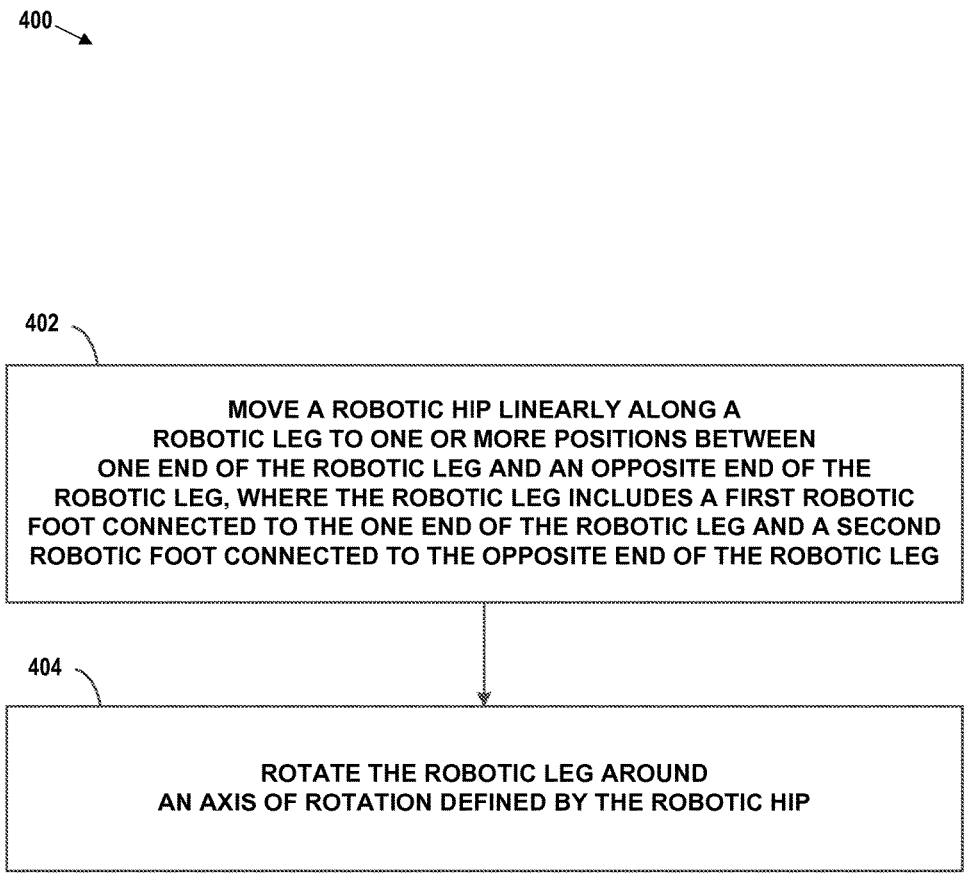
FIG. 4 is a flow chart, according to example implementations.

FIG. 4 is a flow chart 400, according to example implementations. These implementations may be carried out by one or more of the robotic systems as described above in relation to FIGS. 1-3 or any other robotic systems described herein.

At block 402, a robotic system may move a robotic hip linearly along a robotic leg to one or more positions between one end of the robotic leg and an opposite end of the robotic leg. The robotic leg may include a first robotic foot connected to the one end of the robotic leg and a second robotic foot connected to the opposite end of the robotic leg.

For example, block 402 may be carried out by the robotic system 300 moving the robotic hip 304 linearly along the robotic leg 306 to one or more positions between one end of the robotic leg 306 and an opposite end of the robotic leg 306. Further, the robotic leg 306 may include the first robotic foot 308 connected to the one end of the robotic leg 306 and the second robotic foot 310 connected to the opposite end of the robotic leg 306.

Further, the robotic system 300 may move the second robotic hip 314 linearly along the second robotic leg 316 to one or more positions between one end of the second robotic leg 316 and an opposite end of the second robotic leg 316. Further, the second robotic leg 316 may include a third robotic foot 318 connected to the one end of the second robotic leg 316 and a fourth robotic foot 320 connected to the opposite end of the second robotic leg 320.

Yet further, a first length of the robotic leg 306 may be approximately equivalent to a second length of the second robotic leg 316. Thus, moving the robotic hip 304 linearly along the robotic leg 306 may include moving the robotic hip 304 to a first position approximately halfway between the one end of the robotic leg 306 and the opposite end of the robotic leg 306. Further, moving the second robotic hip 314 linearly along the second robotic leg 316 may include moving the second robotic hip 314 to a second position approximately halfway between the one end of the second robotic leg 316 and the opposite end of the second robotic leg 316.

As noted above, a robotic hip may move linearly along a respective robotic leg. Yet further, the robotic leg may cause the robotic hip to move the along the robotic leg to one or more positions along the robotic leg between one end of the robotic leg and an opposite end of the robotic leg. For example, the robotic leg may include one or more motors connected to the robotic hip that positions the robotic hip to a particular position of the one or more positions along the robotic leg between the one end of the robotic leg and an opposite end of the robotic leg.

At block 404, the robotic system may rotate the robotic leg around an axis of rotation defined by the robotic hip. For example, block 404 may be carried out by the robotic system 300 rotating the robotic leg 306 around the axis of rotation 312 defined by the robotic hip 304. Further, the robotic system 300 may rotate the second robotic leg 316 around the second axis of rotation 322 defined by the second robotic hip 314. Further, based on rotating the robotic leg 306 and the second robotic leg 322, the implementations may include causing the robotic system 300 to take an initial step with the first robotic foot 308 and a subsequent step with the third robotic foot 318.

In some implementations, rotating the robotic leg 306 includes rotating the robotic leg 306 up to 180 degrees around the axis of rotation 312 defined by the robotic hip 304, where rotating the robotic leg 306 causes the weight of the robotic system to shift from being placed on the second robotic foot 310 to the first robotic foot 308. Further, rotating the second robotic leg 316 may include rotating the second robotic leg 316 up to 180 degrees around the second axis of rotation 322 defined by the second robotic hip 314, where rotating the second robotic leg 316 causes the weight of the robotic system 300 to shift from being placed on the fourth robotic foot 320 to the third robotic foot 318.

In some implementations, rotating the robotic leg 306 may include rotating the robotic leg 316 up to 360 degrees around the axis of rotation 312 defined by the robotic hip 304. Further, the robotic system 300 rotating the second robotic leg 316 may include rotating the second robotic leg 316 up to 360 degrees around the second axis of rotation 322 defined by the second robotic hip 314. As such, the robotic leg 306 and the second robotic leg 316 may rotate with an approximate phase difference of approximately 90 degrees.

In practice, the robotic systems may perform the blocks in the flow chart 400 to take one or more steps for bipedal walking, jogging, running, and/or jumping. Further, in some implementations, the robotic system 300 may apply, by the first spring 324, a first force against the third robotic foot 310 and apply, by the second spring 326, a second force on the fourth robotic foot 320. Thus, the robotic system 300 may be spring over objects that may be in its path.

Figure 5A:
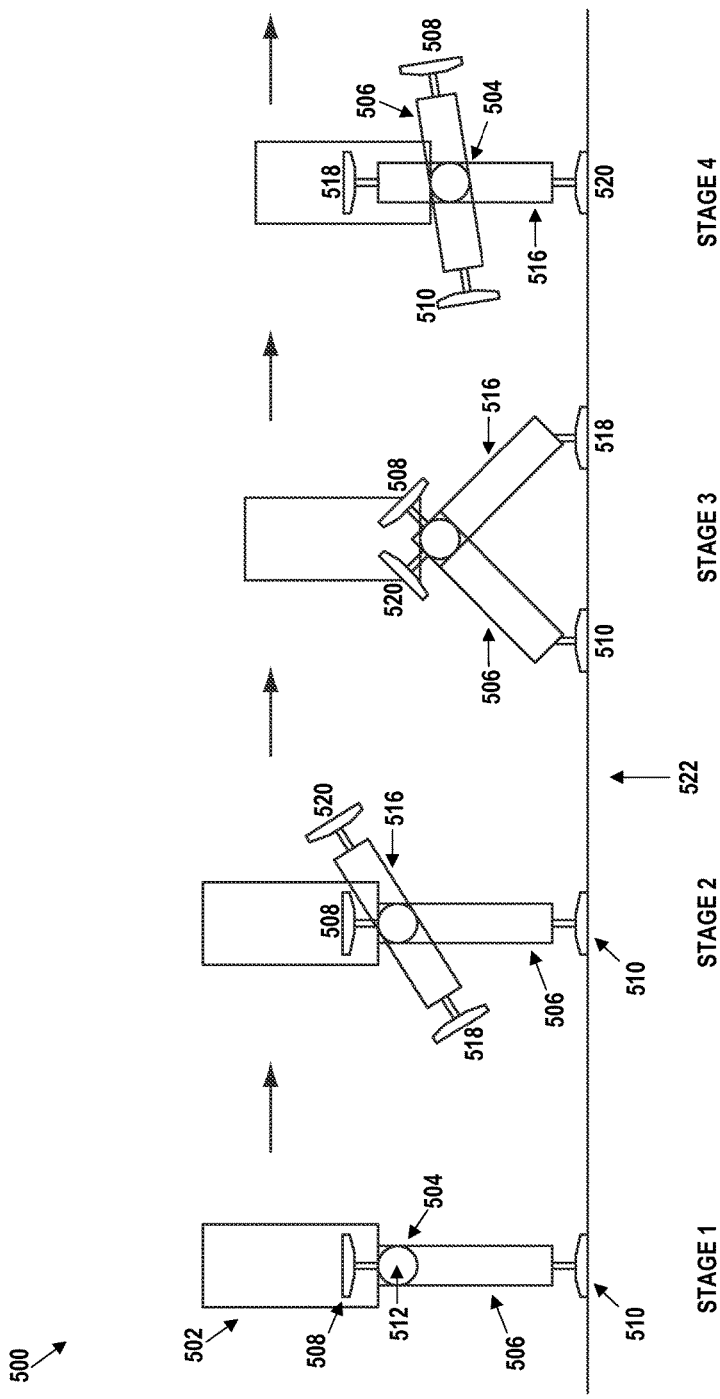
FIGS. 5A and 5B depict aspects a robotic system, according to example implementation.
Figure 5B:
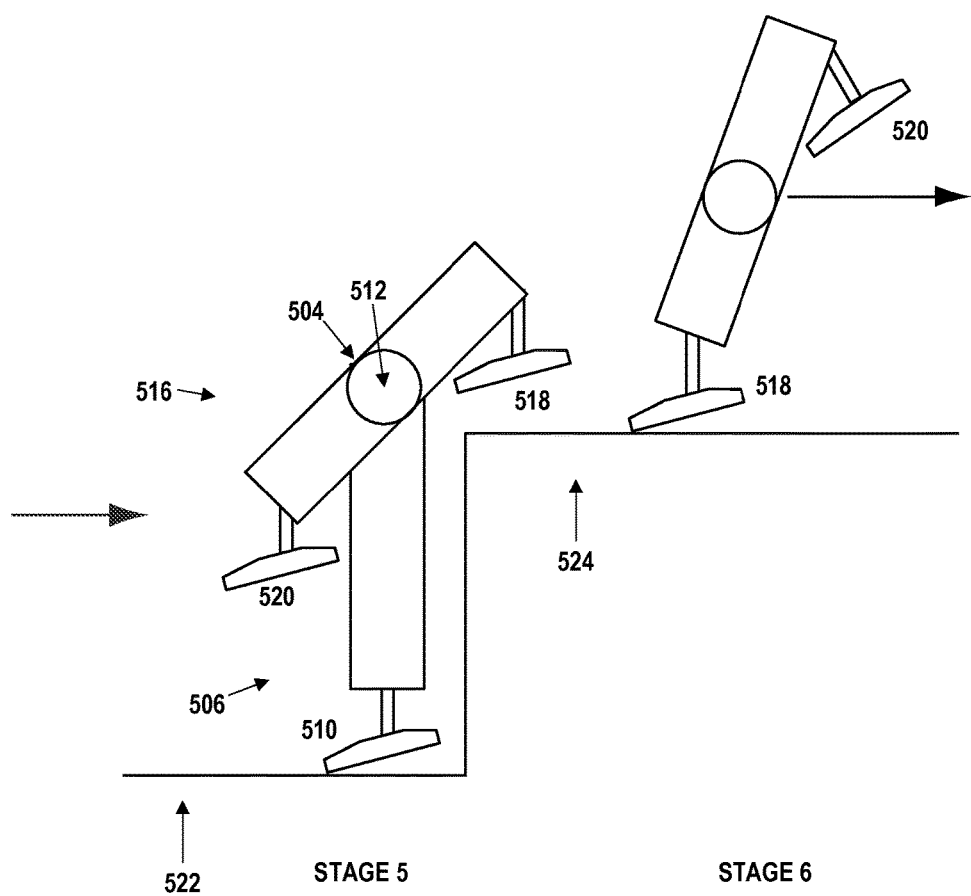

FIGS. 5A and 5B depict aspects of a robotic system 500, according to example implementation. The implementations of the flow chart 400 may also be carried out by the robotic system 500. The robotic system 500 may take, for example, the form of a bipedal robot device and/or a multi-legged robot device described above in relation to FIGS. 1 through 4. Further, the robotic system 500 may include, for example, one or more of the parts described above in relation to the FIGS. 1 through 4. For instance, the robotic system 500 may take the form of the robotic system 300 described above in relation to FIG. 3.

For example, the robotic system 500 may include a robotic body 502, a robotic hip 504, a first robotic foot 508, and a second robotic foot 510. Further, the robotic system 500 may include a second robotic hip, a third robotic foot 518, and a fourth robotic foot 520. Yet further, the robotic system 500 may include a first axis of rotation 512 defined by the robotic hip 504 and a second axis of rotation defined by the second robotic hip. As such, the robotic system 500 may perform one or more operations that may be performed by the robotic system 300 described above in relation to FIG. 3.

FIGS. 5A and 5B may illustrate stages 1 through 6 of the robotic system 500. Further, the FIGS. 5A and 5B may illustrate a side-view of the robotic device 500 such that the first axis of rotation 512 may be shown in the stages 1 through 6. For purposes of illustration and explanation, and without any limitations, the first robotic hip 504 and the second robotic hip may be approximately level such that they are equivalent distances away from the from the surface 522. Yet, the first robotic hip 512 and the second robotic hip are linearly movable along respective robotic legs to be different distances away from the surface 522.

As shown in stage 1 of FIG. 5A, the robotic system 500 may be in a standing position, possibly before taking one or more steps. The robotic system 500 may have moved the robotic hip 504 linearly along the robotic leg 506 to one end of the robotic leg 506 proximately connected to the first robotic foot 508. Further, the robotic system 500 may have moved the second robotic hip linearly along the second robotic leg 516 to one end of the second robotic leg 516 proximately connected to the third robotic foot 518.

As shown in stage 2, the robotic system 500 may switch robotic feet, possibly to shift the weight of the robotic system 500 from one robotic foot to another robotic foot. For example, the robotic system 500 may move the second robotic hip linearly along the second robotic leg 516. Further, the second robotic hip may move to a position between the one end of the second robotic leg 516 and an opposite end of the second robotic leg 516 proximately connected to the fourth robotic foot 520.

Further, as shown in stage 2, the robotic system 500 may lift the second robotic leg 516 off the surface 522 and balance the weight of the robotic system 500 on the second robotic foot 510 while rotating the second robotic leg 516. The robotic system 500 may rotate the second robotic leg 516 approximately 90 to 180 degrees around the second axis of rotation defined by the second robotic hip. For instance, the robotic system 500 may switch from the fourth robotic foot 520 to the third robotic foot 518. In this way, the weight of the robotic system 500 may be shifted from being placed on the fourth robotic foot 520 to the third robotic foot 518.

As shown in stage 3, the robotic system 500 may take a step forward. For example, the robotic system 500 may move the second robotic hip linearly along the second robotic leg 516 to the opposite end of the second robotic leg 516. Further, as shown in stage 3, the robotic system 500 may rotate the second robotic leg 516 approximately 45 degrees around the second axis of rotation to take a step forward with the third robotic foot 518.

As shown in stage 4, the robotic system 500 may move in the windmill type fashion. For example, the robotic system 500 may move the robotic hip 504 linearly along the robotic leg 506 to a first position approximately halfway between the one end of the robotic leg 506 and an opposite end of the robotic leg 506 proximately connected to the second robotic foot 510. Further, the robotic system 500 may move the second robotic hip 514 linearly along the second robotic leg 516 to a second position approximately halfway between the one end of the second robotic leg 516 and the opposite end of the second robotic leg 516.

Further, as shown in stage 4, the robotic leg 506 and the second robotic leg 516 may rotate around the first axis of rotation 512 and the second axis of rotation, respectively. In addition, the robotic leg 506 and the second robotic leg 516 may rotate with a phase difference of approximately 90 degrees. In particular, the first robotic foot 508 may take a first step, followed by the third robotic foot 518 taking a second step, followed by the second robotic foot 510 taking a third step, and followed by the fourth robotic foot 520 making a fourth step. As such, the robotic leg 506 and the second robotic leg 516 may move in the windmill type fashion to propel the robotic system 500 in a given direction.

As shown in stage 5 of FIG. 5B, the robotic system 500 may move from the surface 522 to an elevated surface 524. For example, the robotic system 500 may move the robotic hip 504 linearly along the robotic leg 506 to the one end of the robotic leg 506. The second robotic hip 514 may be in the second position approximately halfway between the one end of the second robotic leg 516 and the opposite end of the second robotic leg 516

Further, as shown in stage 5, the robotic system 500 may rotate the second robotic leg 516 around the second axis of rotation such that the third robotic foot 518 may take a step on the elevated surface 524. For example, the robotic system 500 may build speed towards the elevated surface 524, and the second robotic leg 516 and the third robotic foot 518 may be used to lift, vault, and/or catapult the robotic system 500 above the elevated surface 524. Further, as show in stage 6, the robotic system 500 may continue moving on the elevated surface 524.

As such, the robotic system 500 may take one or more steps for bipedal walking, jogging, running, and/or jumping. In particular, the robotic system 500 may walk without the making windmill type movements. Yet, the robotic system 500 may make the windmill type movements to conserve power, reduce the motion of robotic legs swinging forward to take steps, and decrease the chances of tripping over objects. Further, the robotic system 500 may include the first spring 324 and the second spring 326 to spring over objects as described above in relation to FIGS. 3 and 4.

III. Additional Implementations

FIGS. 6A and 6B depict aspects of a robotic system, according to an example implementation. The robotic system 600 may take the form of a bipedal robot device as described above in relation to FIGS. 1-5. Further, the robotic system 600 may include, for example, one or more of the parts of the robotic systems described above in relation FIGS. 1-5, respectively.

For example, as shown in FIG. 6A, the robotic system 600 may include a robotic body 602, a robotic hip 604 connected to the robotic body 602, a ball screw 628 connected to the robotic hip 604, and robotic leg 606 connected to the robotic hip 604 parallel to the ball screw 628. Further, the robotic system 600 may include a second robotic hip 614 connected to the robotic body 602, a second ball screw 630 connected to the second robotic hip 614, and a second robotic leg 616 connected to the second robotic hip 614 parallel to the second ball screw 630.

Further, the robotic leg 606 may include a first spring 624 that applies a first force against a second robotic foot 610. Yet further, the second robotic leg 616 may include a second spring 626 that applies a second force against a fourth robotic foot 620. As such, the first spring and the second spring may store energy for applying the first force and the second force, respectively.

FIG. 6B may depict aspects of a robotic leg and robotic hip. For example, the robotic leg 606 may include a ball screw 628, possibly such that the ball screw 628 is parallel to the robotic leg 606 and/or inside the robotic leg 606. Further, the robotic hip 604 may include a motor 632 that is linearly movable to one or more positions along the ball screw 628 between one end of the robotic leg 606 and an opposite end of the robotic leg 606.

As noted, FIG. 6B may depict aspects of the ball screw 628 parallel to robotic leg 606. The second robotic leg 616 may also include the ball screw 630, possibly such that the second ball screw 630 is parallel to the robotic leg 616 and/or inside the robotic leg 616. Further, the second robotic hip 614 may include a second motor 634 that is linearly movable to one or more positions along the second ball screw 630 between one end of the second robotic leg 616 and an opposite end of the second robotic leg 616. As such, the second robotic leg 616 may have one or more parts of the robotic leg 606.

In some implementations, the ball screws 628 and 630 may be mechanical actuators that translate rotation motion to linear motion of the robotic hips 604 and 614 to one or more positions along the robotic legs 606 and 616, respectively. Further, the robotic hips 604 and 614 may move linearly up and down the ball screws 628 and 630, respectively, with low internal friction and high precision. In some instances, the ball screws 628 and 630 may each withstand impacts and heavy loads, possibly increasing the durability of the robotic system 600.

Further, the mass of the ball screws 628 and 630 may each be approximately 0.1-5 kg, the mass of the robotic legs 606 and 616 may each be approximately 1-10 kg, and the mass of the motors 632 and 634 may each be approximately 10-20 kg. As such, the ball screws 628 and 630 may each have a smaller mass than the robotic legs 606 and 616, respectively. Further, the ball screws 628 and 630 may each have a smaller mass than the motors 632 and 634, thereby reducing inertial effects when the robotic legs 606 and 616 rotate around the robotic hip 604 and the second robotic hip 614, respectively. By reducing such inertial effects, the dynamics of the robotic system 600 (e.g., the robotic legs 606 and 616) may be controlled.

In some implementations, the robotic leg 606 may be fully rotatable around an axis of rotation 612 defined by the robotic hip 604. Further, a first robotic foot 608 may be connected to the one end of the robotic leg 606 and a second robotic foot 610 may be connected to the opposite end of the robotic leg 606. Further, the second robotic leg 616 may be fully rotatable around a second axis of rotation 622 defined by the second robotic hip 614. Further, a third robotic foot 618 may be connected to the one end of the robotic leg 616 and a fourth robotic foot 620 may be connected to the opposite end of the second robotic leg 616.

Further, as shown in FIG. 6B, the robotic leg 606 may include a torque limiter 636 that determines an amount of torque applied by the motor 632, an encoder 638 that determines a particular position of the motor 632 from the one or more positions along the ball screw 628, and an electromagnetic brake 640 that holds the motor 632 at the particular position and releases the motor 632 from the particular position. Further, the motor 632 and the electromagnetic brake 640 may also be positioned in other areas of the robotic leg 606. For example, in some implementations, the motor 632 may be proximate to the torque limiter 636. Further, the motor 632 may be in a fixed or semi-fixed position proximate to the torque limiter 636. As such, the motor 632 may turn the ball screw 628 to move the robotic hip 604 to one or more positions along the ball screw 628.

In some implementations, the robotic system 600 may include a computer-readable medium that stores program instructions executable by one or more processors such as the processor 106 of the robotic system 100 described above in relation to FIG. 1. The program instructions may be executed by the processors to cause the robotic system 600 to perform operations. For example, the processors may cause the torque limiter 636 to determine that the amount of torque applied by the motor 632 exceeds one or more torque thresholds. Based on determining the amount of torque applied, the processors may cause the electromagnetic brake 640 to apply a friction to hold the motor 632 at the particular position of along the ball screw 628.

In some implementations, the electromagnetic brake 640 may include brake pads that block the motor 632 from moving on the ball screw 628. Yet further, the electromagnetic brake 640 may apply the pressure on the motor 632 to hold the motor 632 in place on the ball screw 628. By the electromagnetic brake 640 blocking the motor 632 and/or applying pressure on the motor 632, the motor 632 may reduce the amount of torque applied below the one or more torque thresholds.

In some implementations, the robotic system 600 may include a temperature sensor 642 that measures the temperature of the robotic system 600 based on the friction applied to hold the motor 640 at the particular position along the ball screw 628. For example, the temperature sensor 642 may measure the temperature of the motor 632, the electromagnetic brake 640, and/or the ball screw 628, among other parts of the robotic system 600.

Further, the robotic system 600 may determine that the measured temperature exceeds one or more temperature thresholds. Based on exceeding the one or more temperature thresholds, the electromagnetic brake 640 may release the friction applied to hold the motor 632 at the particular position along the ball screw 628. As such, the motor 632 may increase the amount of torque applied by the motor 632. Thus, after releasing the friction applied, the temperature of the robotic system 600 may decrease below the one or more temperature thresholds.

In some implementations, the motor 632 and the electromagnetic brake 640 may tradeoff applying torque and friction, respectively, to hold the motor 632 at the particular position. For example, the motor 632 may apply torque to hold the motor 632 in place until the one or more torque thresholds are exceeded, thereby causing the electromagnetic brake 640 to apply the friction to hold the motor 632 in place. The friction may cause the motor 632 to lower the amount of torque applied to hold the motor 632 in place.

Further, the electromagnetic brake may hold the motor 632 in place until the one or more temperature thresholds are exceeded, thereby causing the motor 632 to apply more torque to hold the motor 632 in place. As such, the electromagnetic brake 640 may release the friction applied to hold the motor 632 in place. In practice, the one or more torque thresholds and the one or more temperature thresholds may be predetermined and/or modified.

Figure 7:
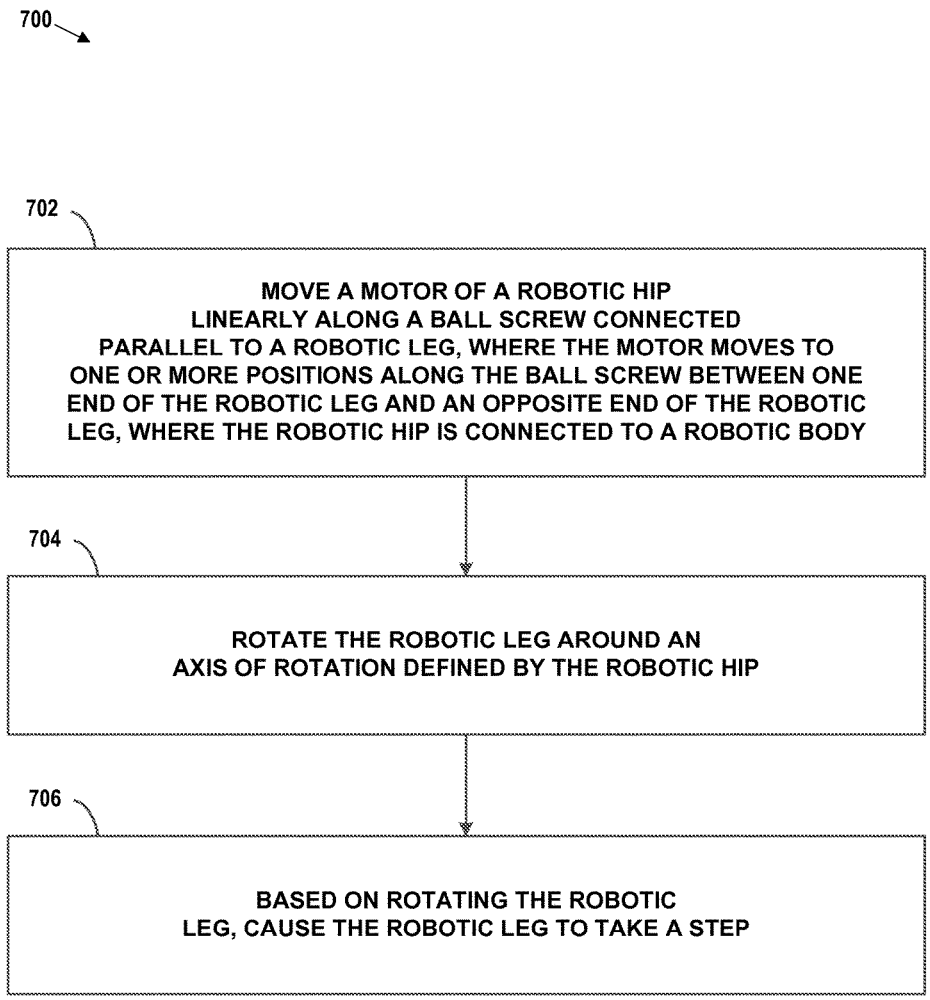
FIG. 7 is a flow chart, according to example implementations.

FIG. 7 is a flow chart 700, according to example implementations. The implementations may be carried out by one or more of the robotic systems described above in relation to FIGS. 1 through 6B.

At block 702, the robotic system may move a motor of a robotic hip linearly along a ball screw connected parallel to a robotic leg, where the motor moves to one or more positions along the ball screw between one end of the robotic leg and an opposite end of the robotic leg, where the robotic hip is connected to a robotic body. For example, the robotic system may move the robotic hip linearly along the robotic leg in any manner described above in relation to block 402 of FIG. 4.

Further, block 702 may be carried out by the robotic system 600 moving the motor 632 of the robotic hip 604 linearly along the ball screw 628 connected parallel to the robotic leg 606, where the motor 632 moves to one or more positions along the ball screw 628 between one end of the robotic leg 606 and an opposite end of the robotic leg 606.

In some implementations, the robotic system 600 may move a second motor 634 of a second robotic hip 614 linearly along a second ball screw 630 connected parallel to a second robotic leg 616, where the second motor 634 moves to one or more positions along the ball screw 630 between one end of the second robotic leg 616 and an opposite end of the second robotic leg 616. As shown, the second robotic hip 614 may be connected to the robotic body 602.

In some implementations, the torque limiter 636 may determine that an amount of torque applied by the motor 632 exceeds one or more torque thresholds. Further, the encoder 638 may determine a particular position of the motor 632 from the one or more positions along the ball screw 628. Based on determining the particular position of the motor 632, the electromagnetic brake 640 may apply a friction to hold the motor 632 at the particular position along the ball screw 628. Yet further, the motor 632 may reduce the torque applied by the motor 632 below the one or more torque thresholds.

In some implementations, the temperature sensor 642 may determine a temperature of the robotic system 600 based on the friction applied to hold the motor 632 at the particular position along the ball screw 628. Based on determining the temperature of the robotic system 600, the electromagnetic brake 640 may release the friction applied to hold the motor 632 at the particular position along the ball screw 638. Yet further, the motor may increase the amount of torque applied to hold the motor 632 at the particular position along the ball screw 628.

At block 704, the robotic system may rotate the robotic leg around an axis of rotation defined by the robotic hip. For example, the robotic system may rotate the robotic leg around the axis of rotation defined by the robotic hip in any manner described above in relation to block 404 of FIG. 4.

Further, block 704 may be carried out by the robotic system 600 rotating the robotic leg 606 around the axis of rotation 612 defined by the robotic hip 604. Yet further, the robotic system 600 may rotate the second robotic leg 616 around a second axis of rotation 622 defined by the second robotic hip 634.

In some implementations, the robotic leg 606 may rotate around the axis of rotation 612 defined by the robotic hip 612 includes the robotic leg 606 rotating up to 180 degrees around the axis of rotation 612, where a first robotic foot 608 is connected to the one end of the robotic leg 606 and a second robotic foot 610 is connected to the opposite end of the robotic leg 606.

In some implementations, the robotic leg 606 may rotate up to 180 degrees around the axis of rotation 612 defined by the robotic hip 604, where rotating the robotic leg 606 causes the weight of the robotic system to shift from being placed on the second robotic foot 610 to the first robotic foot 608. Further, rotating the second robotic leg 616 may include rotating the second robotic leg 616 up to 180 degrees around the second axis of rotation 622 defined by the second robotic hip 614, where rotating the second robotic leg 616 causes the weight of the robotic system 600 to shift from being placed on the fourth robotic foot 620 to the third robotic foot 618.

At block 706, based on rotating the robotic leg, the robotic system may cause the robotic leg to take a step. Further, based on rotating the second robotic leg, the robotic system may cause the second robotic leg to take a step. In some implementations, the robotic system may cause the robotic leg and/or the second robotic leg to take a step in any manner described above in relation to FIGS. 1 through 6.

IV. Additional Examples of Robotic Systems

Figure 8:
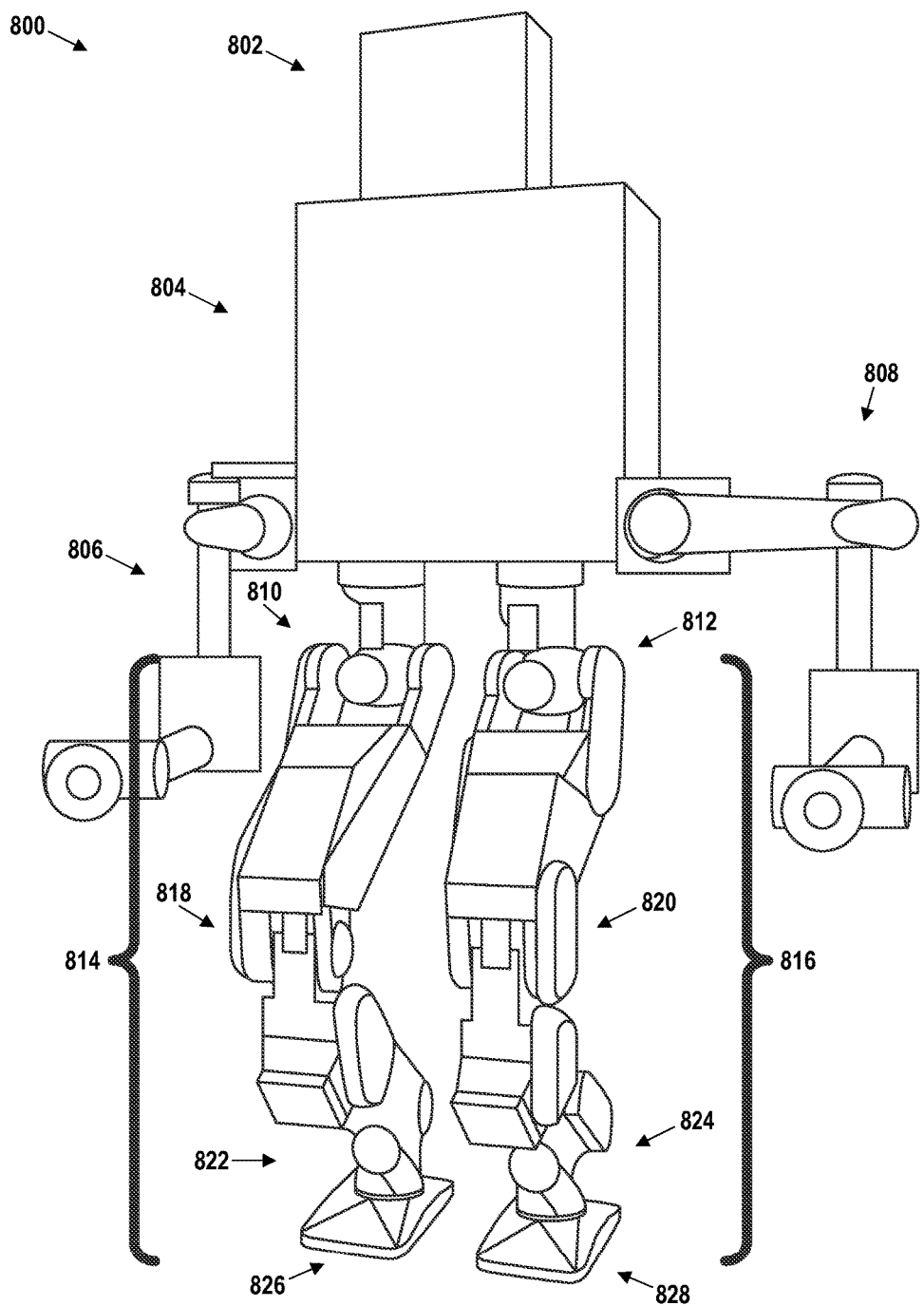
FIG. 8 depicts aspects of a robotic system, according to an example implementation.

FIG. 8 depicts a robotic system, according to an example implementation. The robotic system 800 may include, for example, one or more parts of the robotic systems described above in relation to FIGS. 1-7. For example, the robotic legs 814 and 816 may include sensors 110 such as a sensor that measures inertial forces and/or G-forces in multiple dimensions, a force-torque sensor, a ground force sensor, a friction sensor, and/or a ZMP sensor, among other possibilities. Further, the robotic system 800 may include one or more motors that generate heat and are cooled by lower temperature liquids around the motors. As such, the robotic system 800 may also engage in bipedal walking.

The robotic system 800 may include a robotic head 802, a robotic body 804, two robotic arms 806 and 808, two robotic hips 810 and 812, and two robotic legs 814 and 816. Further, the robotic legs 814 and 816 may include two robotic knees 818 and 820, two robotic ankles 822 and 824, and two robotic feet 826 and 828, respectively. As such, the robotic system 800 may be capable of using robotic arms 806 and 808 to interact with an environment, possibly beyond the capabilities of the robotic system 300.

Figure 9:
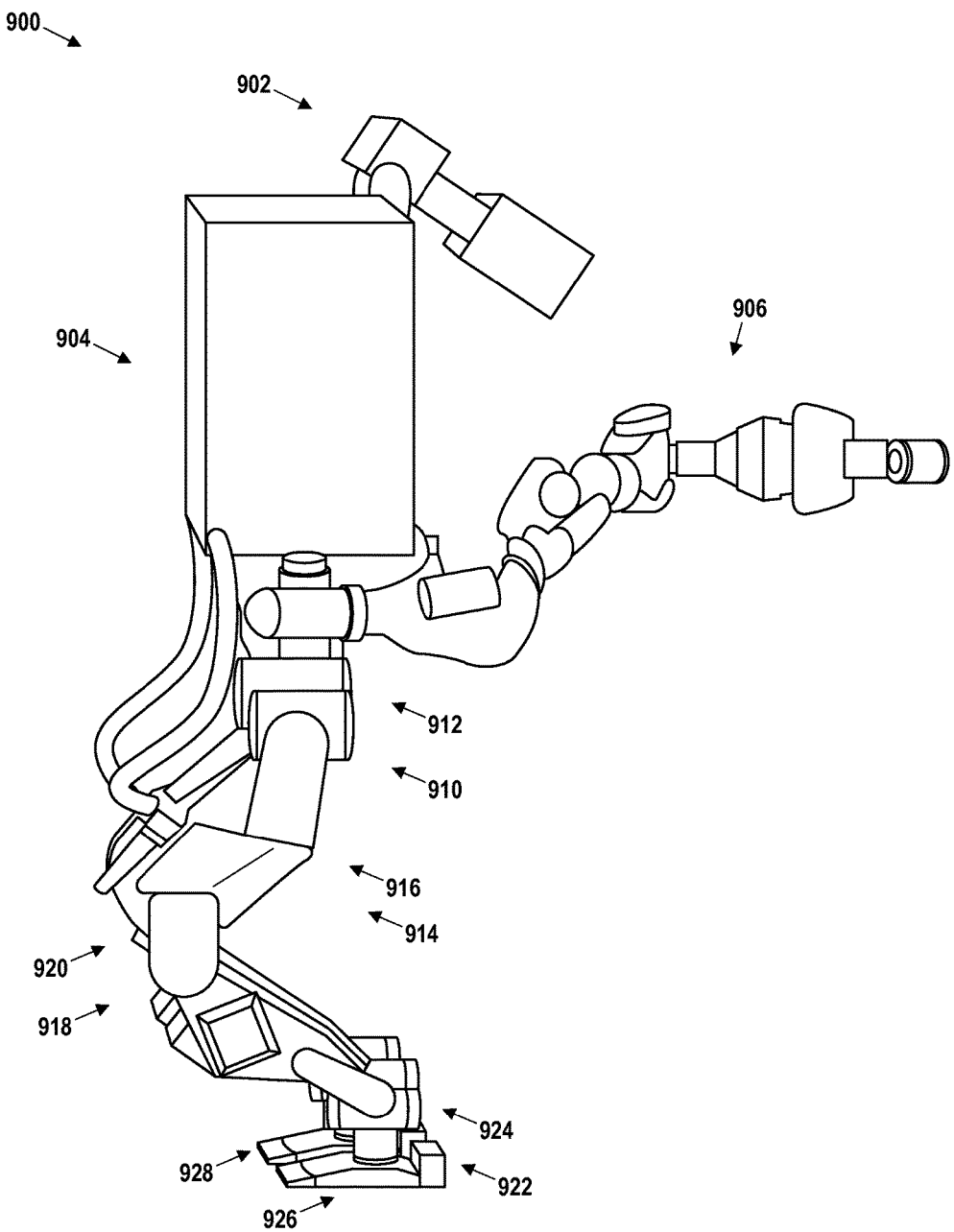
FIG. 9 depicts aspects of a robotic system, according to an example implementation.

FIG. 9 depicts aspects of a robotic system, according to an example implementation. The robotic system 900 may include, for example, one or more parts of the robotic systems described above in relation to FIGS. 1-8. As shown, FIG. 9 may illustrate a side view of the robotic system 900. The robotic system 900 may include a robotic head 902, a robotic body 904, a robotic arm 906, a robotic hip 910, a second robotic hip 912, a robotic leg 914, and a second robotic leg 916. Further, the robotic legs 914 and 916 may include a robotic knee 918 and a second robotic knee 920, respectively. Further, the robotic legs 914 and 916 may include a robotic ankle 922 and a second robotic ankle 924, and a robotic foot 926 and a second robotic foot 928, respectively.

In some implementations, the robotic systems described above in relation to FIGS. 1-9 may be used in environments involving natural and human-made disasters. For example, these robotic systems may perform activities in disaster zones to help victims in the vicinity of such disaster zone. In particular, these robotic systems may adapt to various types of sites that the robotic systems may not have previously encountered. As such, these robotic systems may demonstrate some autonomy in making decisions and data obtained from sensors 110. Further, these robotic systems may be controlled remotely based on receiving one or more commands to perform operations.

For example, the robotic systems may travel through areas that may be unsafe for living beings. In particular, these robotic systems may operate in natural disaster areas affected by earthquakes, fires, natural gas leaks, and/or exposures to radioactive elements, among other possible areas. For example, the robotic system 800 of FIG. 8 may open a door using the robotic arms 806 and 808. Further, the robotic arms 806 and/or 808 may keep the door open while the robotic legs 814 and 816 walk through the doorway. The robotic system 800 may pick up debris that obstructs pathways, possibly using the robotic arms 806 and 808 to move the debris. The robotic system 800 may cut through walls using one or both of the robotic arms 806 and/or 808. For example, the robotic arm 806 may include a saw that may protrude from the robotic arm 806 such that the robotic arm 806 may be directed to cut an opening into a wall. As such, the robotic system 800 may create escape routes for saving living beings that may be trapped in confined areas.

The robotic systems may operate a diverse assortment of tools, possibly designed to be used by human persons. For example the robotic system 900 may identify a hose that may be connected to water valve. The robotic system 900 may carry the hose and connect the hose to the water valve using the robotic arm 906. Further, the robotic system 900 may use the robotic arm 906 to turn a wheel of the valve that allows water to flow through the valve and into the hose. As such, the robotic system 900 may control the valve and carry the hose to various locations, providing water to such locations.

In some implementations, the robotic systems may be used in various manufacturing facilities. For example, the robotic systems may be used in an assembly line with multiple work stations along the assembly line that add parts to a partially-finished machine. The robotic systems may move parts to various work stations on the assembly line and also from one work station to another. Further, the robotic systems may place parts on the partially-finished machine to facilitate the creation of a finished machine, among other possibilities.

Figure 10:
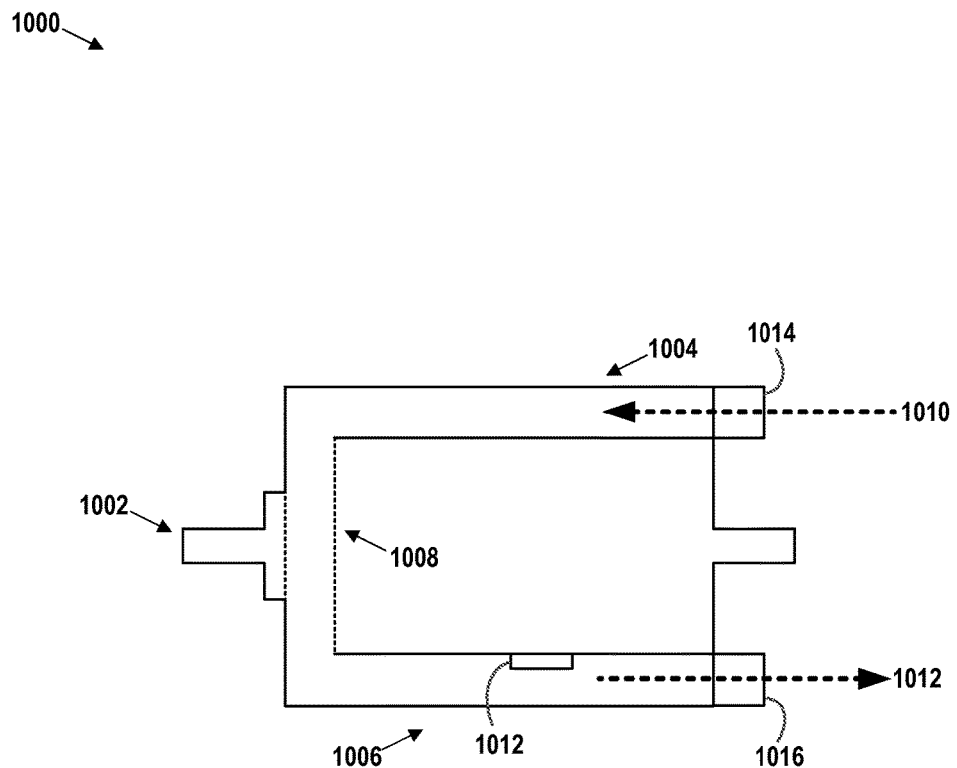
FIG. 10 depicts aspects of a liquid-cooled device, according to an example implementation.

FIG. 10 depicts aspects of a liquid-cooled device 1000, according to an example implementation. The liquid-cooled device 1000 may be incorporated, for example, with the robotic systems as described above in relation to FIGS. 1-9. For example, the liquid-cooled device 1000 may be incorporated with any of the motors described above that generate heat. In particular, one or more liquid-cooled devices 1000 may be incorporated in the hips 304 and 314 of the robotic system 300. In particular, the one or more liquid-cooled devices 1000 may include motors to move the robotic hips 304 and 314 along robotic legs 306 and 316, respectively.

For example, one or more liquid-cooled devices 1000 may be used to move the robotic hip 304 along the robotic leg 306 to a first position of the one or more positions between the one end of the robotic leg 306 and the opposite end of the robotic leg 306. Further, the one or more liquid-cooled devices 1000 may be used to move the second robotic hip 314 along the second robotic leg 316 to a second position of the one or more positions between the one end of the second robotic leg 316 and the opposite end of the second robotic leg 316, as described above in relation to FIG. 3. Yet further, the one or more liquid-cooled devices 1000 may include the motors 632 and 634 to move the motors 632 and 634 along the ball screws 628 and 630, respectively, as described above in relation to FIG. 6.

As shown, FIG. 10 may illustrate a side view of the liquid-cooled device 1000. The liquid-cooled device 1000 may be a water-cooled device that actively controls the temperature of the motor 1002. For example, the liquid-cooled device 1000 may estimate the internal temperature of the motor 1002 and based on such estimations, the liquid-cooled device 1000 may cool the motor 1002 by passing cooling liquids around the motor 1002. As such, robotic systems with the liquid-cooled device 1000 may be able to create high torque forces using the motor 1002 to move robotic limbs, but also prevent overheating the motor 1002.

The motor 1002 may be a 50-350 Watt brushless motor operable at high speeds. Channels 1004, 1006, and 1008 may make contact with the motor 1002 to absorb, transfer, and/or displace heat (e.g., thermal energy) from the motor 1002, possibly to reduce the temperature of the motor 1002. Further, the channels 1004-1008 may encapsulate the motor 1000, possibly to increase contact with the surface area of the motor 1002. Thus, the channels 1004-1008 may absorb heat produced by the motor 1002 and the surface contact of the channels 1004-1008 with the motor 1002 may cool the motor 1002.

Valves 1014 and 1016 may control liquids flowing in and out of channels 1004 and 1006, respectively. For example, a liquid 1010 may flow into the channel 1004 to cool the motor 1002 and a liquid 1012 may flow out of channel 1006. The liquid 1010 may have a lower temperature than the motor 1002 and the liquid 1012 may have a higher temperature than the liquid 1010. Thus, the channels 1004 and 1006 may be connected by channel 1008 such that the liquid 1010 may flow into channel 1004 through channel 1008 and liquid 1012 may flow out of the channel 1006. In some implementations, there may be a constant flow of liquid 1010 flowing into the channel 1004 and liquid 1012 flowing out of the channel 1006. Further, the liquid 1012 may flow into a reservoir to cool the liquid 1012 such that the liquid 1012 may flow back into channel 1004 to cool the motor 1002. The liquids 1010 and 1012 may also flow in an opposite direction such that liquid 1012 may flow into channel 1006 through channel 1008 and liquid 1010 may flow out of channel 1004.

The temperature of a motor may be difficult to determine. As such, the channel 1006 may include a sensor 1012. The sensor 1012 may include, for example, one or more of the sensors 110 described above in relation to FIG. 1. Thus, the sensor 1012 may determine the temperature of the liquid 1010 to estimate the temperature of the motor 1002. For example, the sensor 1012 may determine that the temperature of the liquid 1012 meets or exceeds a temperature threshold, possibly approximating 100 to 150 degrees Celsius. As such, the valve 1016 may open to release the liquid 1010.

The robotic system may include a driver operable to deliver high current to the motor 1002. By using high power sources to power the driver, the driver may deliver approximately 40-240 Amperes to the motor 1000. Further, the driver may include a copper layer that may also be cooled by channels 1004-1008 of the liquid-cooled device 1000 and the liquids 1008 and 1010. As such, with measures for preventing overheating, the maximum current of the motor 1002 may be approximately 20 times greater than conventional motors. Thus, the drivers enable the motor 1002 to produce larger torque forces in a shortened period of time.

V. Conclusion

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A robotic system comprising:
   a robotic body;
   a first robotic hip connected to the robotic body;
   a first robotic leg connected to the first robotic hip, wherein a first robotic foot is connected to one end of the first robotic leg and a second robotic foot is connected to an opposite end of the first robotic leg, wherein the first robotic leg is fully rotatable around a first axis of rotation defined by the first robotic hip, and wherein the first robotic hip is linearly movable along the first robotic leg to one or more positions between the one end of the first robotic leg and the opposite end of the first robotic leg;
   a second robotic hip connected to the robotic body; and
   a second robotic leg connected to the second robotic hip, wherein a third robotic foot is connected to one end of the second robotic leg and a fourth robotic foot is connected to an opposite end of the second robotic leg, wherein the second robotic leg is fully rotatable around a second axis of rotation defined by the second robotic hip, wherein the second robotic hip is linearly movable along the second robotic leg to one or more positions between the one end of the second robotic leg and the opposite end of the second robotic leg, and wherein a surface area of a bottom surface of the third robotic foot is different than a surface area of a bottom surface of the fourth robotic foot, wherein a surface area of a bottom surface of the first robotic foot is equal to the surface area of the bottom surface of the third robotic foot, and wherein a surface area of a bottom surface of the second robotic foot is equal to the surface area of the bottom surface of the fourth robotic foot.

2. The robotic system of claim 1, wherein the robotic system further comprises a computer-readable medium having stored thereon program instructions that, when executed by one or more processors of the robotic system, cause the robotic system to perform operations comprising:
 causing the first robotic hip to move along the first robotic leg to a first position of the one or more positions between the one end of the first robotic leg and the opposite end of the first robotic leg; and
 causing the second robotic hip to move along the second robotic leg to a second position of the one or more positions between the one end of the second robotic leg and the opposite end of the second robotic leg.

3. The robotic system of claim 2, wherein a first length of the first robotic leg is equivalent to a second length of the second robotic leg, wherein the first position is half way between the one end of the first robotic leg and the opposite end of the first robotic leg, and wherein the second position is half way between the one end of the second robotic leg and the opposite end of the second robotic leg.

4. The robotic system of claim 2, the operations further comprising:
 causing the first robotic leg to rotate 360 degrees around the axis of rotation defined by the first robotic hip; and
 causing the second robotic leg to rotate 360 degrees around the second axis of rotation defined by the second robotic hip, wherein the first robotic leg and the second robotic leg rotate with a phase difference of 90 degrees.

5. The robotic system of claim 2, the operations further comprising:
 causing the first robotic leg to rotate 180 degrees around the axis of rotation defined by the first robotic hip, wherein weight of the robotic system is shifted from being placed on the second robotic foot to the first robotic foot;
 causing the second robotic leg to rotate 180 degrees around the second axis of rotation defined by the second robotic hip, wherein the weight of the robotic system is shifted from being placed on the fourth robotic foot to the third robotic foot; and
 based on causing the first robotic leg and the second robotic leg to rotate, causing the robotic system to take an initial step with the first robotic foot and a subsequent step with the third robotic foot.

6. The robotic system of claim 2, wherein the robotic system further comprises one or more liquid-cooled devices, and wherein the operations further comprise:
 using the one or more liquid-cooled devices to move the first robotic hip along the first robotic leg to a first position of the one or more positions between the one end of the first robotic leg and the opposite end of the first robotic leg; and
 using the one or more liquid-cooled devices to move the second robotic hip along the second robotic leg to a second position of the one or more positions between the one end of the second robotic leg and the opposite end of the second robotic leg.

7. The robotic system of claim 1, wherein the first robotic leg comprises a first spring that applies a first force against the second robotic foot, and wherein the second robotic leg comprises a second spring that applies a second force against the fourth robotic foot.

8. The robotic system of claim 1, wherein a material of the bottom surface of the third robotic foot is different than a material of the bottom surface of the fourth robotic foot, wherein a material of the bottom surface of the first robotic foot is the same as the material of the bottom surface of the third robotic foot, and wherein a material of the bottom surface of the second robotic foot is the same as the material of the bottom surface of the fourth robotic foot.

9. The robotic system of claim 8, wherein the material of the bottom surface of the third robotic foot comprises a rubber base that facilitates friction against adjacent surfaces.

* * * * *